United States Patent
Bejerano et al.

(10) Patent No.: US 8,693,361 B2
(45) Date of Patent: *Apr. 8, 2014

(54) METHOD AND APPARATUS FOR IMPROVED MULTICAST SERVICE USING FEEDBACK MOBILES

(75) Inventors: Yigal Bejerano, Springfield, NJ (US); Thyagarajan Nandagopal, Edison, NJ (US); Katherine H. Guo, Scotch Plains, NJ (US)

(73) Assignee: Alcatel Lucent, Paris (FR)

( * ) Notice: Subject to any disclaimer, the term of this patent is extended or adjusted under 35 U.S.C. 154(b) by 63 days.

This patent is subject to a terminal disclaimer.

(21) Appl. No.: 13/031,395

(22) Filed: Feb. 21, 2011

(65) Prior Publication Data

US 2012/0213097 A1    Aug. 23, 2012

(51) Int. Cl.
*H04J 1/16* (2006.01)
(52) U.S. Cl.
USPC .......................................... 370/252; 370/312
(58) Field of Classification Search
USPC ......... 370/252, 312, 310, 338, 389, 390, 408, 370/432, 474
See application file for complete search history.

(56) References Cited

U.S. PATENT DOCUMENTS

| | | | |
|---|---|---|---|
| 6,791,981 B1* | 9/2004 | Novaes | 370/390 |
| 2005/0259643 A1* | 11/2005 | Chuah et al. | 370/389 |
| 2008/0181159 A1* | 7/2008 | Metzler et al. | 370/312 |
| 2009/0125776 A1* | 5/2009 | Cheon et al. | 714/748 |
| 2010/0027440 A1* | 2/2010 | Qi et al. | 370/252 |
| 2010/0165908 A1* | 7/2010 | Mun et al. | 370/312 |
| 2011/0211468 A1* | 9/2011 | Zhang et al. | 370/252 |
| 2011/0211517 A1* | 9/2011 | Moscibroda et al. | 370/312 |
| 2012/0140648 A1* | 6/2012 | Bejerano et al. | 370/252 |
| 2012/0188929 A1* | 7/2012 | Zhang et al. | 370/312 |

OTHER PUBLICATIONS

Chandra,R.; Karanth,S.;Moscibroda,T.;Navda,V.;Padhye, J.;Ramjee,R.;Ravindranath,L.; "DirCast:A Practical & Efficient Wi-Fi Multicast Sys.", ICNP 2009, pp. 161-170, Oct. 13-16, 2009.
CISCO—White Paper—"Optimizing Enterprise Video Over Wireless" LAN, 2010.
Aruba Networks "Aruba Video Quick Reference & Design Guide" 2009.
Venkatesan, G., Ashley, A., 802.11aa—"Robust Audio Video Transport Streaming San Francisco Closing Report" Jul. 2009.
Maraslis, K.; Chatzimisios,P.; Boucouvalas,A., "IEEE 802.11AA: "Improvements on Video Transmission Over Wireless LANs, 2012.
Kuri, J., and Kashera S.K. "Reliable Multicast in Multi-Access Wireless LANs", ACM Wirel. Netw., 2001, 7, (4), pp. 359-369.

(Continued)

*Primary Examiner* — Abdullah Riyami
(74) *Attorney, Agent, or Firm* — J. K. Jacobs (57) ABSTRACT

Various methods and devices are provided to address the need for improved multicast operation. In one method, a mobile device receives a multicast packet from a station, the mobile device being one of a plurality of mobile devices that includes a group of feedback mobile devices. The mobile device transmits an indication that it is volunteering to become a member of the group of feedback mobile devices and determines whether to begin operating as a member of the group of feedback mobile devices. If the mobile device is to begin operating as a member of the group of feedback mobile devices, the mobile device transmits an indication of channel quality and/or a level of interference observed by the mobile device.

8 Claims, 6 Drawing Sheets

(56) References Cited

OTHER PUBLICATIONS

Zhao Li, Herfet,T. "BLBP: A Beacon-Driven Leader Based Protocol for MAC Layer Multicast Error Control in Wireless LANs", WICOM '08 4th Intl Conf Oct. 12-14, 2008, pp. 1-4.

Zhao Li, Herfet,T. "HLBP: A Hybrid Leader Based Protocol for MAC Layer Multicast Error Control in Wireless LANs", IEEE Globecom 2008, vol., No, pp. 1-6 Nov. 30, 2008-Dec. 4, 2008.

Gupta,S.K.S; Shankar,V.; Lalwani,S; "Reliable Multicast MAC Protocol for Wireless LANs", IEEE ICC, Anchorage, USA, May 2003, pp. 93-97.

Seok, Y., and Choi, Y. "Efficient Multicast Supporting in Multi-Rate Wireless Local Area Networks" Lecture notes Comput. Sci, 2003-2662, pp. 273-283.

Basalamah., Sugimoto,H., and Sato, T., "Rate Adaptive Reliable Multicast MAC Protocol for WLANs", Proc. VTC, Melbourne, AUS, May 2006, pp. 1212-1220.

Villalon,J;Cuenca,P.;Orozco-Barbosa,L.;Seok, Y;Turletti, T.;ARSM A Cross-Layer Auto Rate Selection Multicast Mech. for Multi-Rate Wirels LANs, IET, V5.1, N5, pp. 893-902 Oct. 2007.

* cited by examiner

METHOD AND APPARATUS FOR IMPROVED MULTICAST SERVICE USING FEEDBACK MOBILES

FIELD OF THE INVENTION

The present invention relates generally to communications and, in particular, to multicast service in wireless communication systems.

BACKGROUND OF THE INVENTION

This section introduces aspects that may help facilitate a better understanding of the inventions. Accordingly, the statements of this section are to be read in this light and are not to be understood as admissions about what is prior art or what is not prior art.

In recent years IEEE 802.11-based wireless local area network (WLAN) technology, referred to as WiFi, has been rapidly deployed all over the world and the vast majority of mobile devices are WiFi enabled, including laptops, PDAs and smartphones. Recently it has been proposed by both academia and industry to use WiFi for video and content distribution. However, IEEE 802.11 lacks adequate support for multicast services, which hinders the use of IEEE 802.11 technology as a means for video distribution to a large number of mobile devices. More specifically, according to the specification of the IEEE 802.11 standard, broadcast/multicast frames are transmitted at a fixed and low bit rate due to the absence of a feedback mechanism such as ACK. This simple broadcasting technique with no feedback mechanism raises some technical issues such as:

a. High packet loss due to interference and a hidden node problem, which may significantly degrade the quality of the provided video stream.

b. Low network utilization due to transmission at low bit rate.

Thus, new solutions and techniques that are able to address one or more of the issues encountered when using WiFi for video and/or content distribution would meet a need and advance wireless communications generally.

Specific embodiments of the present invention are disclosed below with reference to FIGS. 1-6. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the logic flow diagrams above are described and shown with reference to specific steps performed in a specific order, some of these steps may be omitted or some of these steps may be combined, sub-divided, or reordered without departing from the scope of the claims. Thus, unless specifically indicated, the order and grouping of steps is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

SUMMARY OF THE INVENTION

Various methods and devices are provided to address the need for improved multicast operation. In one method, a station transmits a multicast packet to a plurality of mobile devices that includes a group of feedback mobile devices. An indication of whether the multicast packet was received by that feedback mobile device is received from each feedback mobile device of the group of feedback mobile devices. When the indication received from at least one feedback mobile device of the group of feedback mobile devices indicates that the multicast packet was not received (e.g., receiving a negative acknowledgment or no acknowledgment at all), the multicast packet is retransmitted to the plurality of mobile devices and to the group of feedback mobile devices. An article of manufacture is also provided, the article comprising a processor-readable storage medium storing one or more software programs which when executed by one or more processors performs the steps of this method.

Many embodiments are provided in which the method above is modified. For example, in many embodiments an indication of channel quality and/or a level of interference observed by at least one feedback mobile device is received from the at least one feedback mobile device of the group of feedback mobile devices. This indication may be used to determine a modulation scheme for transmitting multicast packets, to determine whether to utilize a forward error correction mechanism, and/or to determine whether to retransmit a multicast packet. In many embodiments, each mobile device of the plurality of mobile devices is either a member of the group of feedback mobile devices or is adjacent to a member of the group of feedback mobile devices. Being adjacent to a member of the group of feedback mobile devices involves being at most a predefined adjacency distance from a member of the group of feedback mobile devices and/or having a difference in channel quality with that of a member of the group of feedback mobile devices which is within an adjacency threshold.

In some embodiments, the station transmits to the plurality of mobile devices an indication of location and channel quality of the mobile devices included in the group of feedback mobile devices. In some embodiments, the station receives from a mobile device an indication that the mobile device is volunteering to become a member of the group of feedback mobile devices and the station may add the mobile device to the group of feedback mobile devices if the mobile device has the lowest channel quality of any other volunteering mobile device within a predefined adjacency distance from the mobile device. In some embodiments, the station may remove a mobile device from the group of feedback mobile devices if the mobile device has a higher channel quality than another member of the group of feedback mobile devices that is within a predefined adjacency distance from the mobile device.

In another method, a mobile device receives a multicast packet from a station, the mobile device being one of a plurality of mobile devices that includes a group of feedback mobile devices. The mobile device transmits an indication that it is volunteering to become a member of the group of feedback mobile devices and determines whether to begin operating as a member of the group of feedback mobile devices. If the mobile device is to begin operating as a member of the group of feedback mobile devices, the mobile device transmits an indication of channel quality and/or a level of interference observed by the mobile device. An article of manufacture is also provided, the article comprising a processor-readable storage medium storing one or more software programs which when executed by one or more processors performs the steps of this method.

Many embodiments are provided in which the method above is modified. For example, in some embodiments, the mobile device receives an indication of location and channel quality of the mobile devices included in the group of feedback mobile devices. Prior to transmitting the indication that the mobile device is volunteering, the mobile device may determine that no members of the group of feedback mobile devices are within a predefined adjacency distance from the mobile device. Determining whether to begin operating as a member of the group of feedback mobile devices may involve receiving by the mobile device an indication that the mobile device has been added to the group of feedback mobile devices.

In some embodiments, the mobile device receives an indication of channel quality from the mobile devices included in the group of feedback mobile devices. Prior to transmitting the indication that the mobile device is volunteering, the mobile device may determine that no members of the group of feedback mobile devices are adjacent the mobile device and have a lower channel quality. Determining whether to begin operating as a member of the group of feedback mobile devices may involve monitoring by the mobile device for any indications that another mobile device having a lower channel quality is volunteering or operating as a member of the group of feedback mobile devices.

A transceiver node apparatus is also provided. The transceiver node being configured to communicate with other devices of a system and being operative to transmit a multicast packet to a plurality of mobile devices that includes a group of feedback mobile devices and to receive from each feedback mobile device of the group of feedback mobile devices an indication of whether the multicast packet was received by that feedback mobile device. When the indication received from at least one feedback mobile device of the group of feedback mobile devices indicates that the multicast packet was not received, the transceiver node is operative to retransmit the multicast packet to the plurality of mobile devices and to the group of feedback mobile devices. Many embodiments are provided in which this transceiver node is modified. Examples of such embodiments can be found described above with respect to the first method.

A mobile device apparatus is also provided. The mobile device being configured to communicate with other devices of a system and being one of a plurality of mobile devices that includes a group of feedback mobile devices. The mobile device being operative to receive a multicast packet from a station, operative to transmit an indication that the mobile device is volunteering to become a member of the group of feedback mobile devices, and operative to determine whether to begin operating as a member of the group of feedback mobile devices. If the mobile device is to begin operating as a member of the group of feedback mobile devices, the mobile device is operative to transmit an indication of channel quality and/or a level of interference observed by the mobile device. Many embodiments are provided in which this mobile device is modified. Examples of such embodiments can be found described above with respect to the second method.

DETAILED DESCRIPTION OF EMBODIMENTS

To provide a greater degree of detail in making and using various aspects of the present invention, a description of our approach to improving WiFi multicast and a description of certain, quite specific, embodiments follows for the sake of example. FIGS. 1-4 are referenced in an attempt to illustrate some examples of specific interference problems and specific embodiments of the present invention.

At present, there are several proposals for overcoming the known shortages of WiFi multicast services. These proposals typically require changes to the standards and/or require support from the mobile devices themselves.

In IEEE 802.11 WLANs, multicasting is specified as a simple broadcasting mechanism that does not make use of ACK frames. According to the IEEE 802.11 standards, all frames with multicast and broadcast addresses should be transmitted at one of the rates included in the basic rate set. Several studies on multicasting in IEEE 802.11 WLANs have focused on improving transmission reliability. The most common approach is based on integrating automatic repeat request (ARQ) mechanisms into the protocol architecture. The main challenge of this approach is generating the appropriate acknowledgement messages as well as minimizing the number of retransmissions of each multicast message.

The work of Kuri and Kasera [KK01] proposes a leader-based protocol (LBP) ARQ mechanism. LBP elects one of the multicast group receivers as the leader and allows the leader receiver to send acknowledgement (ACK) and the non-leader receivers to send negative acknowledgement (NACK). After transmission of a multicast message, the leader receiver sends an ACK in reply if the data is received correctly, or does nothing otherwise. If any non-leader receiver detects a transmission error, it sends a NACK. The NACK frame collides with the ACK, if sent by the leader receiver. When the access point (AP) receives an ACK, it considers the transmission as successful. Otherwise, the AP repeats the whole procedure and retransmits the data until a retransmission limit is reached. LBP suffers from three main problems:

(a) If the entire data frame is lost, the non-leader receivers can not reply with NACKs. Thus, in practice LBP is not reliable for non-leader receivers.

(b) LBP suffers from poor performance when the channel error rates are high. Notice that the non-leader receivers send NACKs whenever the received frame is in error, regardless of whether this erroneous frame has been received correctly before or not. Thus in case of a NACK, the AP has to retransmit the message again until all receivers receive the data frame correctly during the same transmission.

(c) The LBP does not provide statistics of the channel condition experienced by the mobiles. Therefore, the AP does not adapt the multicast PHY rate to the state of receivers. This may cause inefficient resource usage of the Wi-Fi channel.

Addressing these issues with the LBP mechanism, Li and Herfet propose two improved schemes to the LBP proposal in [LH28:BLBP] and [LH28:HLBP]. In the Beacon-driven Leader-based Protocol (BLBP) [LH28:BLBP], a beacon frame is sent before any multicast message. The Beacon message contains the sequence number of the multicast message as well as a timer for sensing NACK messages. This information enables each non-leader receiver to check if it has already received the transmitted multicast message. Furthermore, it provides the receiver a time window for sending a NACK message. In [LH28:BLBP] the authors combine BLBP and packet level FEC and propose a Hybrid Leader Based Protocol (HLBP) for the MAC layer multicast error control. HLBP uses block erasure codes for dealing with poor channel conditions.

Gupta et al. [GSL03] present a reliable multicast MAC protocol, termed the 802.11MX protocol. The 802.11 MX uses an ARQ mechanism supplemented by a busy tone signal. When a mobile associated with a multicast group receives a corrupted packet, it sends an NACK tone instead of actually transmitting an NACK frame. Upon detecting the NACK tone, the sender will retransmit the data packet. On the contrary, if the AP does not detect the NACK tone, the AP assumes that the transmission of the multicast packet has been successfully completed. Since the 802.11MX mechanism does not need a leader to operate, it performs better than the LBP protocol in terms of both data throughput and reliability. However, this mechanism requires significant changes to the 802.11 standard. In particular, it assumes the availability of an out-of-band signaling channel for each AP in order for the multicast receivers to transmit the NACK tone.

The studies in [SC03], [BSS06] and [VCOST07] present rate adaptation mechanisms for multicast transmissions with the aim of improving the channel utilization. Seok and Choi [SC03] present the necessity of a multicast rate adaptation mechanism for WLANs. They present a multicast rate selection algorithm based on the traffic load of the WLAN and the channel condition of the multicast receivers. If the WLAN is congested, the multicast is set to use a higher PHY rate than the data rates in the basic service set (BSS) basic rate set parameter for mitigating the congestion. Otherwise, the multicast rate is adjusted according to the worst channel condition among channel conditions of all multicast receivers. However, this mechanism assumes that the AP knows the channel condition of each multicast receiver. In [BSS06] the authors introduced the rate adaptation and reliable multicast delivery scheme. In this scheme the transmitter first sends an RTS frame to indicate the beginning of a multicast transmission. The RTS frame is used by all the multicast receivers to measure the receiver signal strength. Then, each multicast receiver sends a variable length CTS frame whose length is inversely proportional to the experienced channel quality. Thus, receivers with low channel quality will send long CTS frames. Note that the CTS frames will collide. However, the AP can sense the duration of the longest CTS frame and use this duration for adjusting the transmission bit rate of the multicast frame. The authors of [VCOST07] propose a cross-layer auto rate selection multicast mechanism for multi-rate wireless LANs, called ARSM. This scheme can be viewed as a variant of the LBP when each mobile device in the multicast group evaluates its channel condition from the AP by getting the RSSI (received signal strength indication) information from its PHY layer. Then the mobile that suffers from the lowest RSSI is selected as the group leader. The AP uses the RSSI information from the leader for selecting the desired bit-rate of multicast transmissions.

Independent of the above mentioned work on the generation of an appropriate number of acknowledgement messages and minimizing the number of retransmissions for multicast, there is a different area of work of utilizing unicast flows to transmit multicast flows. Several studies propose to map each multicast flow to a few unicast flows. For instance, the DirCast [VCOST07] scheme converts multicast packets to unicast packets targeted to certain selected multicast receivers. Other receivers receive these packets by listening in promiscuous mode. The target receivers are carefully selected to minimize loss rate experienced by the non-targeted receivers. If necessary, mobiles are forced to change the AP they are associated with. In addition, DirCast uses proactive adaptive FEC to further reduce the loss rate and implements a novel virtual multicast interface in order to be compatible with the security needs of the enterprise.

In industry, several IEEE 802.11 equipment vendors as Cisco [Cisco] Aruba [Aruba] and several others solve the drawbacks of the Wi-Fi multicast services by converting each multicast packet into several unicast packets, at the medium access control (MAC) layer and sending individual unicast packets to each one of the receivers. Currently, a new IEEE 802.11 standard is in progress, termed IEEE 802.11aa [802.11aa]. The goal of this draft is to standardize MAC layer enhancements for more reliable multicast transmission of real-time multimedia streams over wireless LANs. This extended reliability is provided via retransmission mechanism (ARQ), which is referred to as "More Reliable Groupcast" (MRG). In MRG, the group membership of every multicast flow is known (e.g., by using Internet Group Management Protocol (IGMP) snooping). After the transmission of one or several multicast packets the sender (typically the AP) invokes a Groupcast Block-ACK polling process. In such process, each receiver individually provides a bit map of previously correctly received multicast packets. Using this information the sender determines the packets that should be retransmitted, which are sent again to the entire group.

Figure 1:
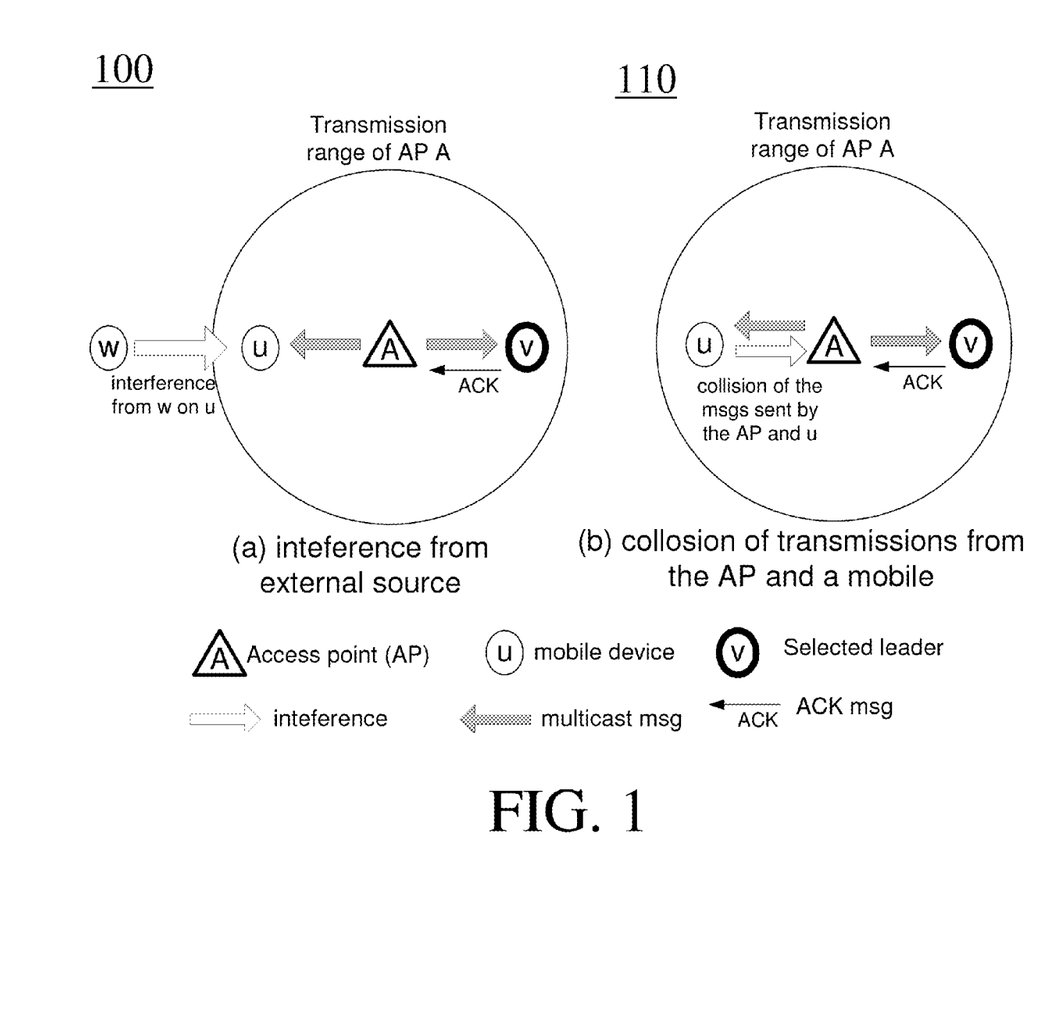
FIG. 1 is a block diagram depiction of two example scenarios in which a leader-based protocol (LBP) fails to detect multicast packets not being received by a multicast receiver.
Figure 2:
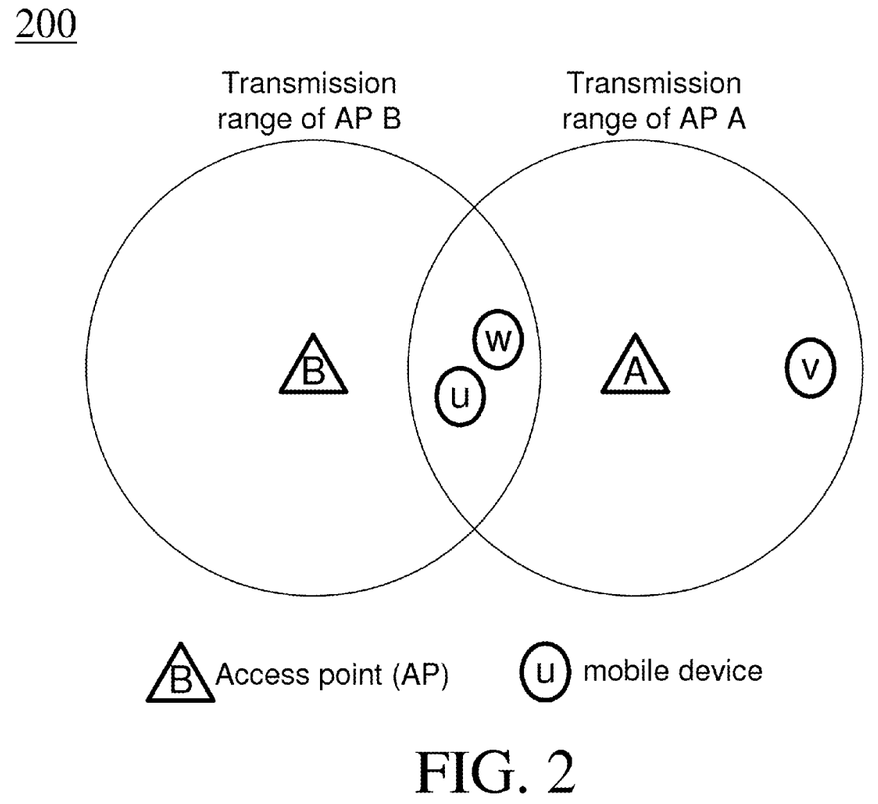
FIG. 2 is a block diagram depiction of an example scenario in which a leader-based protocol (LBP) fails to detect multicast packets not being received by multicast receivers due to interference from an adjacent AP.

Notice that all of the above schemes suffer from one or both of the following weaknesses. Some of them (IEEE-802.11aa and DirCast) cannot scale to deal with a large number of mobile users. Others can be viewed as variation of leader-based protocol (LBP) which may not detect many lost packets in noisy environments or as a result of the hidden node problem. FIG. 1 illustrates some issues with the LBP-based approaches. FIG. 1 depicts two scenarios 100 and 110 in which multicast packets have been correctly received by the leader and acknowledged. Yet in both cases not all the multicast receivers were able to correctly decode the transmitted multicast packets and some receivers are not able to send NACK packets to the AP. These examples each consider a single AP A with two mobiles in the multicast group denoted by nodes U and V. In both cases node V is the selected leader by LBP and we can assume that the channel quality of U and V is similar. In scenario 100 a packet sent by node W interferes with multicast packet sent by AP A at node U, therefore node U is not able to decode the multicast transmission. However, node V can decode the packet and sends an ACK. In scenario 110 the multicast packet sent by the AP A collides with a transmission of node U. Thus, node V can decode the multicast packet and send an ACK although node U did not receive the multicast packet.

Now we consider an IEEE 802.11 wireless LAN (WiFi) with a single or several adjacent access points (APs) that use the same wireless channels. Moreover, we assume this to be a crowded area with a dense mobile population. In such settings, a station transmission may interfere with other transmissions at adjacent AP cells. This situation is in particular aggravated in the case of multicast messages since some of the receivers may correctly receive a transmitted packet while others cannot. For instance, in scenario 200 of FIG. 2, if both APs A and B transmit at the same time, mobile U and W may not decode any of the transmissions (due to collision) but mobile V will be able to decode the packet send by AP A. This is an example of a hidden node problem.

We make the observation that adjacent receivers generally suffer from similar interferences and so there is a correlation between their ability to decode packets. For instance, in FIG. 2, mobile U and W are adjacent to each other, thus if mobile U can decode a multicast packet sent by AP A, then with a high probability mobile W can also decode the packet. We use this observation to suggest a solution that leverages these correlations.

In general, we consider a large group of mobile devices that are interested in receiving the same multicast feed. For instance, they may all want to watch the same video feed, in which multicast packets are frequently sent. For the sake of simplicity, we will consider only this set of listening mobile devices and ignore the other mobile devices that are not listening to the multicast feed. We will use the term "Multicast AP" to denote an AP that sends multicast messages corresponding the particular multicast feed. We will also refer to these components in the description that follows:

(a) Retransmission agent (RA)—The agent accepts feedback from some or all of the mobile nodes and retransmits lost packets, if needed. As an example, the agent may be embodied in software deployed on the AP(s) or on an application level server(s).

(b) Feedback (FB) mobiles—A set that includes some or all of the mobile devices that listen to a given multicast feed and inform the Retransmission Agent(s) regarding lost packets they detect.

In our approach, we select for every Multicast AP a small set of Feedback Mobiles that are close to the boundary of the transmission range of the Multicast AP. Due to their locations, these nodes suffer the lowest channel quality of all the mobiles associated with the given AP and they are more susceptible to interference. The feedback mobiles periodically send updates to the retransmission agent regarding the packets that they have received correctly, the quality of the channel that they experience with the multicast AP, and the level of interference that they are experiencing. As a response, the retransmission agent (RA) may decide to perform one or more of the following actions:

Retransmit some packets,
Add a Forward Error Correction (FEC) mechanism,
Modify a multicast packet transmission bit-rate, and/or
Perform other operations to improve the probability of correct decoding of the multicast feed by all the mobiles.

Figure 3:
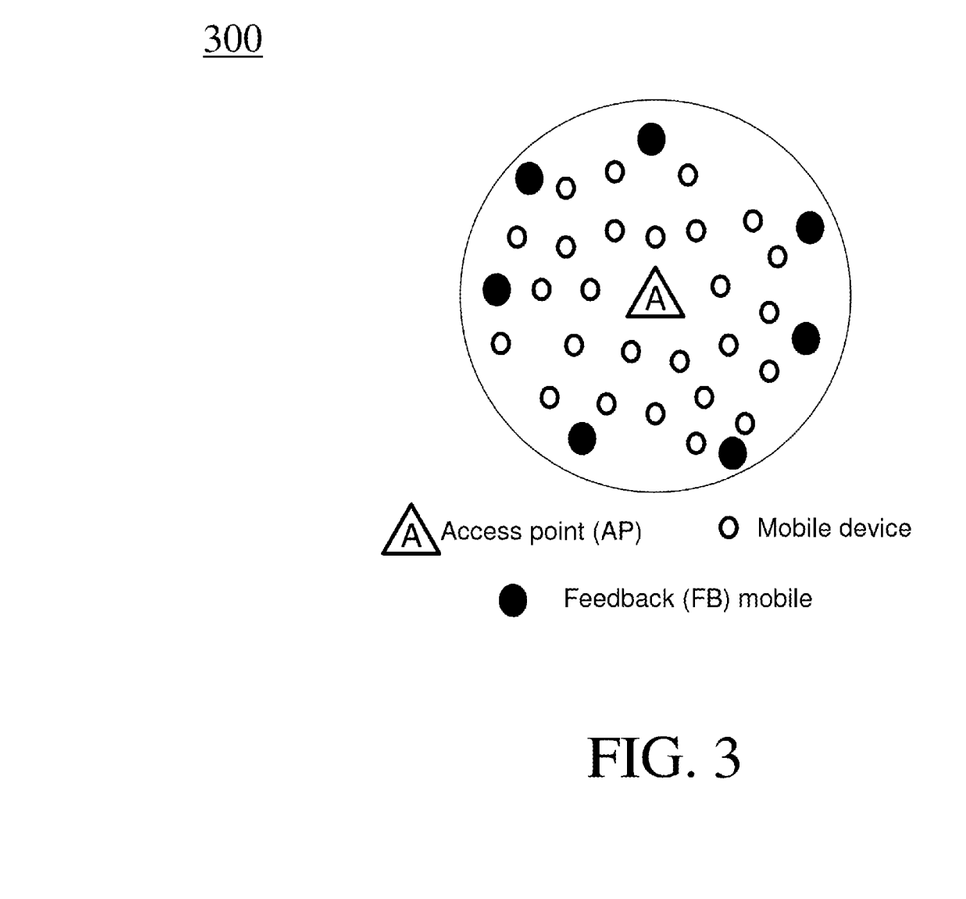
FIG. 3 is a block diagram depicting an AP with mobile devices, a subset of which serve as feedback mobiles, in accordance with various embodiments of the present invention.

Our approach also proposes a selection mechanism for feedback mobiles. Generally speaking, it is desirable that every mobile that listens to a multicast feed be adjacent to a selected feedback mobile, which informs the multicast AP about interference and lost packets in that vicinity. It is desirable to select a small number of feedback mobiles, in order to minimize the overhead of the feedback mechanism, while detecting with high probability any interference/lost packets that may be experienced by any of the mobile nodes. Diagram 300 of FIG. 3 illustrates an AP with mobile devices, a subset of which serve as feedback mobiles. In the example of diagram 300, seven mobiles near the boundary of the AP transmission range are depicted as feedback mobiles.

As an example, we consider a WiFi network with numerous mobile devices that are listening to a given multicast feed. Since every mobile is associated with a single AP, we consider a single multicast AP and only the mobiles that are associated with this AP. Our approach can be extended for WiFi networks with multiple APs in a rather straightforward manner.

Below, we elaborate on our mechanisms for dynamic selection of feedback mobiles. We propose two variants for the same basic scheme:

1. Coordinate-based mechanism—In this variant, we assume that all the mobiles have a relatively accurate knowledge of their location coordinates by using their internal GPS (Global Positioning System) or by using triangulation for evaluating their distances from adjacent APs.
2. Coordinate-free mechanism—In this variant, we assume that the mobiles are oblivious to their location.

Two mobiles that are associated with the same AP are termed adjacent if the distance between them is at most a given maximal adjacency distance. Since the distance between the two mobiles may be unknown for our coordinate-free scheme, we say that two mobiles are adjacent if the difference in their observed channel quality with the AP them is below a certain threshold "H". Generally speaking, we seek to find with minimal communication overhead a small set of feedback mobiles that satisfies the following condition: Every non-feedback mobile "u" is adjacent to a feedback mobile "v" that experiences similar or lower channel quality from the AP than the channel quality observed by "u".

A simple solution for determining a set of feedback mobiles is to require every mobile to send to a FB mobile selection agent (for instance, the Retransmission agent), its channel quality with the AP and its coordinates. The FB mobile selection agent then has all the information for selecting a small set of feedback mobiles that satisfy the above requirement. The problem with this approach is that every mobile is required to send management information to the agent, thus in a crowded environment this solution will generate high communication overhead. In this approach, we present two feedback mobile selection algorithms that are semi-distributed and result in relatively low communication overhead.

The FB mobile selection agent may be realized as software on the AP or on an independent server. We assume that the agent can broadcast (multicast) control messages to the mobiles in the AP's vicinity.

Note that the problem of finding the minimal number of feedback mobiles is a variant of the minimal independent set problem that is known to be NP-hard, even when all the information is known to the FB mobile selection agent. Thus, our schemes do not guarantee to find the optimal solution. Nevertheless, under the assumption that the mobiles can evaluate their distance from other feedback mobiles we can prove an approximation ratio of 5. This means that our schemes will select at most 5 times the number of feedback mobiles that are required by the optimal solution.

Coordinate-Based Mechanism for Feedback Mobile Selection

In this approach we assume that every mobile is aware of its coordinates, e.g., by using its GPS, and these coordinates are accurate enough for our needs. In this process every mobile is in one of three states:

1. FB mobile—a mobile that has been selected as feedback mobile.
2. Volunteer—a mobile that volunteers to serve as FB mobile. This is a mobile that is not aware of any FB mobiles in its vicinity with lower or similar channel quality with the AP.
3. Non-FB mobile—a regular mobile that is aware of another FB mobile in its vicinity with similar or lower channel quality with the AP.

In this approach each FB mobile periodically updates the FB mobile selection agent regarding its location and the channel quality that it is experiencing from the AP, by sending an FBM-ACTIVE message. The FB mobile selection agent periodically broadcasts, to all the mobiles associated with the same multicast AP, an FBM-LIST message that contains the list of feedback mobiles, their locations and the channel quality that they are experiencing with the AP. This enables every non-FB mobile to detect whether it is adjacent to a FB mobile. If it is not adjacent to a FB mobile, the mobile volunteers to serve as feedback mobile and sends a VOLUNTEER message to the FB mobile selection agent with its location and channel quality. The agent collects all the volunteering messages and nominates a volunteering mobile as a feedback mobile if there are no other volunteers in its immediate vicinity (with distance less than D, where D is some threshold value). In the case of several adjacent volunteers, only the one with the lowest channel quality is nominated as a FB mobile. Then the agent informs the newly selected FB mobiles in its following FBM-LIST broadcast message.

We now address the case of adjacent FB mobiles. The network may contain adjacent FB mobiles (within a distance less than D) typically due to movement of the mobile nodes. Usually when a FB mobile changes its location, it stops functioning as a FB mobile; however, node mobility may still generate adjacent FB mobiles as we show in the next example. Consider the case of a single mobile "v" associated with a particular AP. Since "v" is a single mobile it obviously becomes a FB mobile. Now assume that another mobile "u" has moved into the transmission range of the same AP; it is adjacent to "v" (the distance between "u" and "v" is less than D), however "u" suffers from lower channel quality than "v". Thus, to preserve the two requirements above, node "u" is also selected as a FB mobile and now the system contains two adjacent FB mobiles.

In this situation, node "v" detects that it has an adjacent FB mobile and it stops functioning as a FB mobile. To this end, "v" sends an FB-END message to the agent and stops sending feedback regarding the quality of the received multicast messages. Since the FB mobile selection agent is also aware that "u" and "v" are adjacent, it may alternatively originate a FB-END message to node "v".

Recall that a FB mobile may move away from the AP transmission range before sending a FB-END message. If the retransmission agent does not get feedback messages from a FB mobile for a given time duration T (where T is an adjustable threshold value), the FB mobile is no longer considered an FB mobile and is removed from the FB mobile list. This may trigger other mobiles to volunteer to become FB mobiles.

Figure 4:
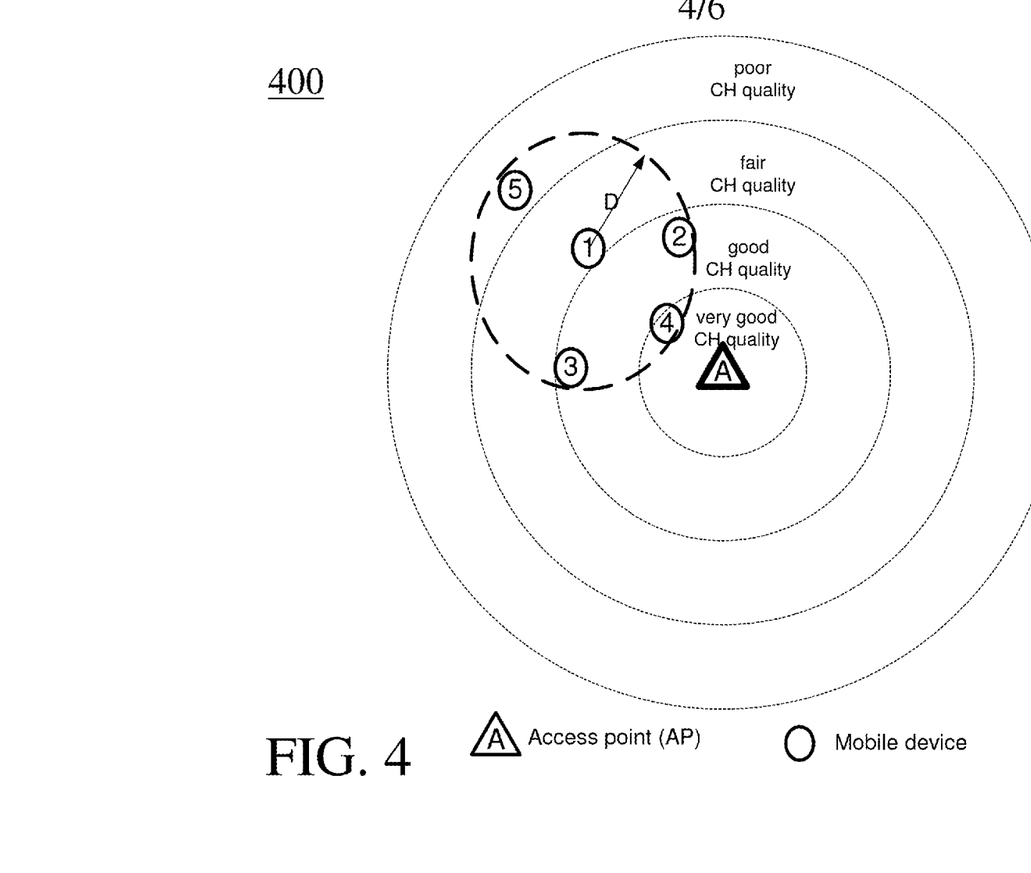
FIG. 4 is a block diagram depicting an AP with mobile devices, a subset of which are selected to serve or begin serving as feedback mobiles, in accordance with various embodiments of the present invention.

Diagram 400 of FIG. 4 illustrates an example of the FB mobile selection process in the case of 5 mobiles. The numbers labeling the mobiles denote the order in which they join the AP vicinity. For example, mobiles 1, 2, 3, 4, 5 join the AP vicinity in that order. In diagram 400, the 4 circles around the AP denote the boundaries of 4 different channel quality levels; very good, good, fair and poor. Note that mobile 1 experiences a fair channel quality, mobiles 2 and 3 have good channel quality, mobile 4 experiences very good channel quality and mobile 5 suffers from poor channel quality. Moreover, the dashed circle around mobile 1 denotes its adjacency region. Initially, mobile 1 joins the system and is selected as a FB mobile. Next, mobiles 2, 3, and 4 join the system. Since they are all adjacent to mobile 1 and they experience better channel quality, none of them is selected as a FB mobile. Then mobile 5 joins the system. Mobile 5 is also adjacent to mobile 1; however, it suffers from lower channel quality and therefore is selected as a FB mobile. Now mobile 1 and 5 are adjacent FB mobiles. Thus, mobile 1 ceases serving as FB mobile. As a result, mobiles 2, 3 and 4 are no longer adjacent to a FB mobile and they volunteer to serve as FB mobiles. Note that mobile 4 is adjacent to both mobile 2 and 3. However, mobile 2 and 3 are not adjacent to each other. Since, Mobile 2 and 3 suffers from lower channel quality than mobile 4, they are both selected as FB mobiles. At the end of this FB mobile selection process, the system contains three FB mobiles, mobiles 2, 3 and 5. In this example, the optimal solution nominates only mobile 1 and 5 as FB mobiles. This demonstrates that our approach may not find the optimal solution; however, the selected set of FB mobiles is near optimal. We elaborate on this topic in the subsection "scheme properties" below.

Coordinate-Free Mechanism for Feedback Mobile Selection

In this approach, the mobiles are oblivious to their locations. However, we assume that a mobile can estimate whether it is adjacent to another mobile based on the received signal strength of the messages sent by the latter. The concept of this variant is similar to the one presented for the coordinate-based scheme. The main difference is that the mobiles cannot inform the FB mobile selection agent about their locations, and every non-feedback mobile needs to infer whether there are any FB mobiles in its vicinity. To this end, we propose that all the mobiles listen to an auxiliary multicast address that is used by the FB mobiles to advertise their presence and the channel quality that they experience from the AP.

In this coordinate-free approach, all the control messages are broadcast using the auxiliary multicast address. In this way, all mobiles can be aware of the messages sent by other mobiles in their proximity. This variant does not require the assistance of an FB mobile selection agent. In this approach, each FB mobile periodically broadcasts an FBM-ACTIVE message that indicates it is an active FB mobile and its channel quality. The FBM-ACTIVE messages enable each non-FB mobile to detect whether it is adjacent to a feedback mobile with lower or similar channel quality. If this is not the case, the mobile volunteers to serve as feedback mobile. It enters a volunteer state and sends several VOLUNTEER messages to inform adjacent mobiles of its intention to become an active FB mobile. If during a given period of time a volunteer mobile does not get FB-ACTIVE or VOLUNTEER messages from other mobiles with a lower channel quality with the AP, then the volunteer becomes an FB mobile and sends an FB-ACTIVE message. Otherwise, a volunteer mobile that receives a VOLUNTEER and/or FB-ACTIVE message from one or more adjacent mobiles with lower channel quality returns to a non-FB mobile state and sends a VOLUNTEER-END message. In the case that several adjacent volunteers have the same channel quality with the AP, the one with the lower ID becomes an FB mobile and the others return to a non-FB mobile state.

Consider again the system described in diagram 400 of FIG. 4. We now describe the FB mobile selection process using the coordinate-free approach. Initially, mobile 1 joins the system and becomes an FB mobile. Next, mobiles 2, 3, and 4 join the system. Since they are all adjacent to mobile 1 and they experience better channel quality, none of them becomes an FB mobile. Then mobile 5 joins the system. Mobile 5 is also adjacent to mobile 1; however, it suffers from lower channel quality and therefore it becomes an FB mobile. Now mobile 1 and 5 are adjacent FB mobiles. Thus, mobile 1 ceases serving as an FB mobile and it sends an FB-END message. As a result, mobiles 2, 3 and 4 are no longer adjacent to an FB mobile, and they volunteer to serve as FB mobiles by sending VOLUNTEER messages. Note that mobile 4 is adjacent to both mobiles 2 and 3. However, mobiles 2 and 3 are not adjacent to each other. Since, mobiles 2 and 3 suffer from lower channel quality than mobile 4, they both become FB mobiles, while mobile 4 returns to a non-FB mobile state. At the end of this process the system contains three FB mobiles, mobiles 2, 3 and 5.

Properties for Feedback Mobile Selection

We now present several properties that are valid for both the coordinate-based and coordinate-free approaches. These properties are given with only proof-sketches.

Property 1: Consider a stable system where the location of the mobiles and their channel quality with the AP are fixed for a sufficient duration. Then, both the coordinate-based and coordinate-free approaches converge to a valid set of FB mobiles in finite time.

Proof-sketch: To simplify our proof, let us assume that no two mobiles experience the same channel quality (evaluated by received signal strength from the AP). We sort the mobiles according to the channel quality that they experience from the AP, starting with mobiles having low channel quality. Now consider any mobile "v" located at the j-th location. The convergence of the algorithms results from the fact that the decision whether node "v" will be a FB mobile or not, does not depend on the state of the mobiles that are placed after "v" in the ordered list of mobiles. This is a direct result of the condition above for a valid FB mobile set. Thus, by induction we can show that once the state of a mobile in the j-th location is determined its state may only affect the state of mobiles that are located after it in the ordered list of mobiles.

Property 2: The problem of selecting a set of FB mobiles with minimal cardinality is NP-hard.

Proof-sketch: The FB mobile selection problem can be viewed as a variant of the independent set problem that is known to be NP-hard. To this end, we create an auxiliary graph G(V,E) where every mobile is represented as a node in V and there is a link (u,v) in E if the mobiles "u" and "v" are adjacent. Note that finding a set of FB mobiles is equivalent to finding an independent set for G (with some other requirements) where every node in V is either a node in the independent set or it is connected with a link to a selected node in the independent set.

Property 3: Both the coordinate-based and coordinate-free approaches calculate valid selections of FB mobiles with at most 5 times the number of FB mobiles of the optimal solution.

Proof-sketch: Note that the graph G(V,E), defined above, that represents adjacencies between the mobile can be viewed as a unit disk graph (UDG). UDGs have the useful property that a node "v" in V may have at most 5 neighbors in any independent set, i.e. the maximal set of neighbors of "v" that are not adjacent to each other may contains at most 5 nodes. By using counting arguments, this implies that every independent set of G contains at most 5 times as many nodes as the optimal independent set. Since, every valid set of FB mobiles is an independent set of G, the number of FB mobiles in our calculated solution is at most 5 times as many as the optimal solution.

The approaches above describe scalable solutions for providing quasi-reliable multicast services. While we do not guarantee correct reception of every multicast message by every receiver that listens to the multicast group, our solutions statistically detect most instances of incorrect multicast reception. Moreover, the proposed solutions enable rate-adaption of the multicast messages for efficient usage of the wireless channel. Existing solutions either cannot scale to support multicast flow to a large number of mobile devices (e.g., unicast-based solutions or solutions based on Block-ACK) or they may fail to detect many of the collisions (e.g., Leader-Based Protocol (LBP)-like solutions) as illustrated in FIG. 1 above. Our solutions detect the vast majority of collisions or incorrect reception of multicast messages, while using a relatively small number feedback mobiles.

The detailed and, at times, very specific description above is provided to effectively enable a person of skill in the art to make, use, and best practice the present invention in view of what is already known in the art. In the examples, specifics are provided for the purpose of illustrating possible embodiments of the present invention and should not be interpreted as restricting or limiting the scope of the broader inventive concepts.

Figure 5:
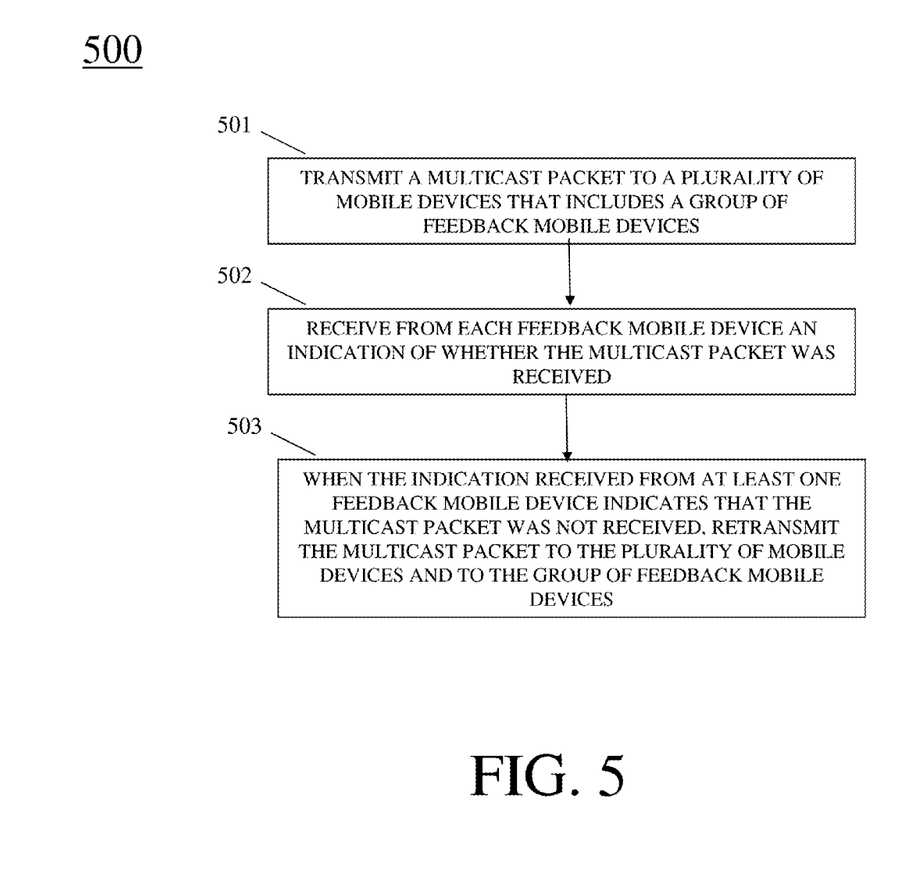
FIG. 5 is a logic flow diagram of functionality performed by a station in accordance with various embodiments of the present invention.
Figure 6:
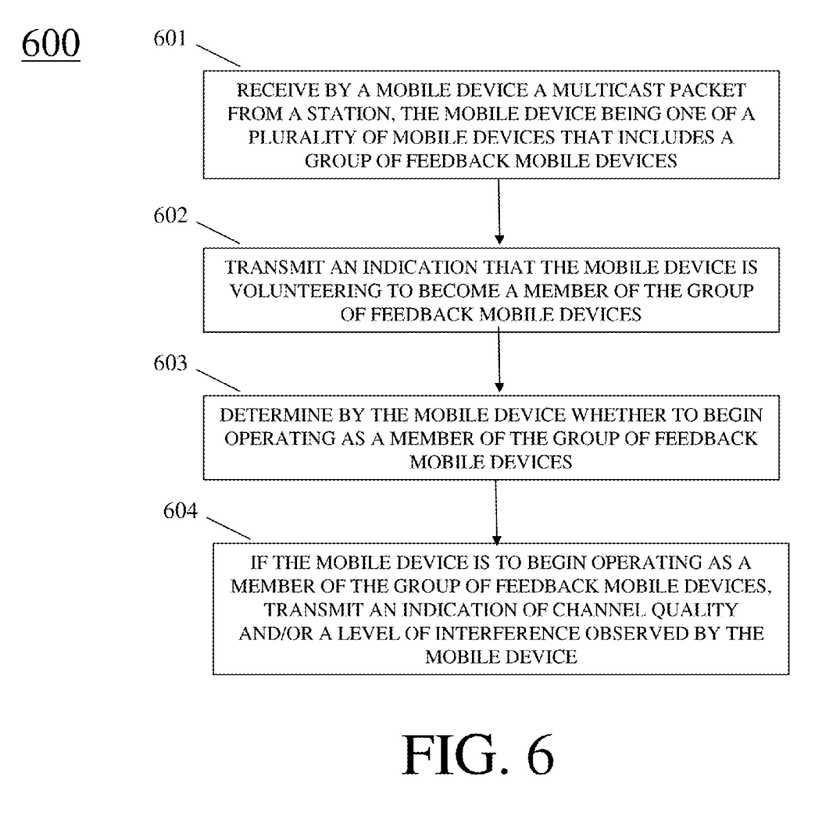
FIG. 6 is a logic flow diagram of functionality performed by a mobile device in accordance with various embodiments of the present invention.

Aspects of embodiments of the present invention can be understood with reference to FIGS. 5 and 6. Diagram 500 of FIG. 5 is a logic flow diagram of functionality performed by a station in accordance with various embodiments of the present invention. In the method depicted in diagram 500, a station transmits (501) a multicast packet to a plurality of mobile devices that includes a group of feedback mobile devices. An indication of whether the multicast packet was received by that feedback mobile device is received (502) from each feedback mobile device of the group of feedback mobile devices. When the indication received from at least one feedback mobile device of the group of feedback mobile devices indicates that the multicast packet was not received (e.g., receiving a negative acknowledgment or no acknowledgment at all), the multicast packet is retransmitted (503) to the plurality of mobile devices and to the group of feedback mobile devices.

Generally, it is desirable for each mobile device of the plurality of mobile devices to either be a member of the group of feedback mobile devices or to be adjacent to a member of the group of feedback mobile devices. Depending on the embodiment, being adjacent to a member of the group of feedback mobile devices involves being at most a predefined adjacency distance from a member of the group of feedback mobile devices and/or having a difference in channel quality with that of a member of the group of feedback mobile devices which is within an adjacency threshold.

Many embodiments are provided in which the method above is modified. For example, in many embodiments an indication of channel quality and/or a level of interference observed by at least one feedback mobile device is received from the at least one feedback mobile device of the group of feedback mobile devices. This indication may be used to determine a modulation scheme for transmitting multicast packets, to determine whether to utilize a forward error correction mechanism, and/or to determine whether to retransmit a multicast packet (such as in 503).

Diagram 600 of FIG. 6 is a logic flow diagram of functionality performed by a mobile device in accordance with various embodiments of the present invention. In the method depicted in diagram 600, a mobile device receives (601) a multicast packet from a station, the mobile device being one of a plurality of mobile devices that includes a group of feedback mobile devices. The mobile device transmits (602) an indication that it is volunteering to become a member of the group of feedback mobile devices and determines (603) whether to begin operating as a member of the group of feedback mobile devices. If the mobile device is to begin operating as a member of the group of feedback mobile devices, the mobile device transmits (604) an indication of channel quality and/or a level of interference observed by the mobile device.

Many embodiments are provided in which the method above is modified. For example, in some embodiments, the mobile device receives an indication of location and channel quality of the mobile devices included in the group of feedback mobile devices. Prior to transmitting the indication that the mobile device is volunteering (as in 602), the mobile device may determine that no members of the group of feedback mobile devices are within a predefined adjacency distance from the mobile device. Determining whether to begin operating as a member of the group of feedback mobile devices (such as in 603) may involve receiving by the mobile device an indication that the mobile device has been added to the group of feedback mobile devices.

In some embodiments, the mobile device receives an indication of channel quality from the mobile devices included in the group of feedback mobile devices. Prior to transmitting the indication that the mobile device is volunteering (as in 602), the mobile device may determine that no members of the group of feedback mobile devices are adjacent the mobile device and have a lower channel quality. Determining whether to begin operating as a member of the group of feedback mobile devices (such as in 603) may involve monitoring by the mobile device for any indications that another mobile device having a lower channel quality is volunteering or operating as a member of the group of feedback mobile devices.

Below is a list of references that are referred to throughout the present specification:

[KK01] Kuri, J., and Kasera, S. K.: 'Reliable multicast in multi-access wireless LANs', ACM Wirel. Netw., 2001, 7, (4), pp. 359-369.

[LH28:BLBP] Zhao Li; Herfet, T.; "BLBP: A Beacon-Driven Leader Based Protocol for MAC Layer Multicast Error Control in Wireless LANs," Wireless Communications, Networking and Mobile Computing, 2008. WiCOM '08. 4th International Conference on 12-14 Oct. 2008, pp. 1-4.

[LH28:HLBP] Zhao Li; Herfet, T.; "HLBP: A Hybrid Leader Based Protocol for MAC Layer Multicast Error Control in Wireless LANs," Global Telecommunications Conference, 2008. IEEE GLOBECOM 2008. IEEE, vol., no., pp. 1-6, Nov. 30, 2008-Dec. 4, 2008.

[GSL03] Gupta, S. K. S., Shankar, V., and Lalwani, S.: 'Reliable multicast MAC protocol for wireless LANs'. IEEE ICC, Anchorage, USA, May 2003, pp. 93-97.

[SC03] Seok, Y., and Choi, Y.: 'Efficient multicast supporting in multi-rate wireless local area networks', Lecture notes Comput. Sci., 2003, 2662, pp. 273-283.

[BSS06] Basalamah, A., Sugimoto, H., and Sato, T.: 'Rate adaptive reliable multicast MAC protocol for WLANs'. Proc. VTC, Melbourne, Australia, May 2006, pp. 1216-1220.

[VCOST07] Villalon, J.; Cuenca, P.; Orozco-Barbosa, L.; Seok, Y.; Turletti, T.; "ARSM: a cross-layer auto rate selection multicast mechanism for multi-rate wireless LANs," Communications, IET, vol. 1, no. 5, pp. 893-902, October 2007.

[CKM+09] Chandra, R.; Karanth, S.; Moscibroda, T.; Navda, V.; Padhye, J.; Ramjee, R.; Ravindranath, L.; "DirCast: A practical and efficient Wi-Fi multicast system," Network Protocols, 2009. ICNP 2009. 17th IEEE International Conference on, vol., no., pp. 161-170, 13-16 Oct. 2009.

[Cisco] Cisco, White-paper, Optimizing Enterprise Video Over Wireless LAN, 2010.

[Aruba] Aruba Video Quick Reference & Design Guide, Aruba networks, http://www.arubanetworks.com/pdf/technology/DG_Video-Reference-and-Design-Guide.pdf.

[802.11aa] IEEE 802.11aa draft—Robust Audio Video Transport Streaming.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

What is claimed is:

1. A method for improved multicast service using feedback mobiles, the method comprising:

receiving by a mobile device a multicast packet from a station, the mobile device being one of a plurality of mobile devices that includes a group of feedback mobile devices;

transmitting by the mobile device an indication that the mobile device is volunteering to become a member of the group of feedback mobile devices;

determining by the mobile device whether to begin operating as a member of the group of feedback mobile devices;

if the mobile device is to begin operating as a member of the group of feedback mobile devices, transmitting an indication of at least one of channel quality and a level of interference observed by the mobile device;

wherein the method further comprises:

receiving by the mobile device an indication of location and channel quality of the mobile devices included in the group of feedback mobile devices and prior to transmitting the indication that the mobile device is volunteering, determining by the mobile device that no members of the group of feedback mobile devices are within a predefined adjacency distance from the mobile device.

2. The method of claim 1, wherein determining whether to begin operating as a member of the group of feedback mobile devices comprises receiving by the mobile device an indication that the mobile device has been added to the group of feedback mobile devices.

3. A method for improved multicast service using feedback mobiles, the method comprising:

receiving by a mobile device a multicast packet from a station, the mobile device being one of a plurality of mobile devices that includes a group of feedback mobile devices;

transmitting by the mobile device an indication that the mobile device is volunteering to become a member of the group of feedback mobile devices;

determining by the mobile device whether to begin operating as a member of the group of feedback mobile devices;

if the mobile device is to begin operating as a member of the group of feedback mobile devices, transmitting an indication of at least one of channel quality and a level of interference observed by the mobile device;

wherein the method further comprises:

receiving by the mobile device an indication of channel quality from the mobile devices included in the group of feedback mobile devices and prior to transmitting the indication that the mobile device is volunteering, determining by the mobile device that no members of the group of feedback mobile devices are adjacent the mobile device and have a lower channel quality.

4. The method of claim 3, wherein determining whether to begin operating as a member of the group of feedback mobile devices comprises monitoring by the mobile device for any indications that another mobile device having a lower channel quality is volunteering or operating as a member of the group of feedback mobile devices.

5. An article of manufacture comprising a non-transitory, processor-readable storage medium storing one or more software programs which when executed by one or more processors performs the steps of the method of claim 1.

6. A mobile device of a communication system, the mobile device being configured to communicate with other devices in the system using a mobile device transmitter and a mobile device receiver and being one of a plurality of mobile devices that includes a group of feedback mobile devices, wherein the mobile device is operative to receive using the mobile device receiver a multicast packet from a station, to transmit using the mobile device transmitter an indication that the mobile device is volunteering to become a member of the group of feedback mobile devices, to determine whether to begin operating as a member of the group of feedback mobile devices, and if the mobile device is to begin operating as a member of the group of feedback mobile devices, to transmit using the mobile device transmitter an indication of at least one of channel quality and a level of interference observed by the mobile device, wherein the mobile device is further operative:

to receive using the mobile device receiver an indication of location and channel quality of the mobile devices included in the group of feedback mobile devices and to determine, prior to transmitting the indication that the mobile device is volunteering, that no members of the group of feedback mobile devices are within a predefined adjacency distance from the mobile device.

7. A mobile device of a communication system, the mobile device being configured to communicate with other devices in the system using a mobile device transmitter and a mobile device receiver and being one of a plurality of mobile devices that includes a group of feedback mobile devices, wherein the mobile device is operative to receive using the mobile device receiver a multicast packet from a station, to transmit using the mobile device transmitter an indication that the mobile device is volunteering to become a member of the group of feedback mobile devices, to determine whether to begin operating as a member of the group of feedback mobile devices, and if the mobile device is to begin operating as a member of the group of feedback mobile devices, to transmit using the mobile device transmitter an indication of at least one of channel quality and a level of interference observed by the mobile device, wherein the mobile device is further operative:

to receive using the mobile device receiver an indication of channel quality from the mobile devices included in the group of feedback mobile devices and to determine, prior to transmitting the indication that the mobile device is volunteering, that no members of the group of feedback mobile devices are adjacent the mobile device and have a lower channel quality.

8. An article of manufacture comprising a non-transitory, processor-readable storage medium storing one or more software programs which when executed by one or more processors performs the steps of the method of claim 3.

* * * * *